(12) United States Patent
Kim (10) Patent No.: US 9,910,317 B2
(45) Date of Patent: Mar. 6, 2018

(54) DISPLAY DEVICE HAVING AN OPTICAL MEMBER SUPPORTER TO PREVENT THE OPTICAL MEMBER FROM BEING DEFLECTED

(71) Applicant: Samsung Display Co., Ltd., Yongin-Si, Gyeonggi-Do (KR)

(72) Inventor: Jinhyoung Kim, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/297,612

(22) Filed: Oct. 19, 2016

(65) Prior Publication Data

US 2017/0123273 A1 May 4, 2017

(30) Foreign Application Priority Data

Nov. 3, 2015 (KR) .................. 10-2015-0154071

(51) Int. Cl.
*G02F 1/1335* (2006.01)
*G02F 1/1333* (2006.01)
*G09F 13/00* (2006.01)
*G09F 9/35* (2006.01)
*G09F 9/33* (2006.01)
*G09F 13/22* (2006.01)

(52) U.S. Cl.
CPC .. *G02F 1/133608* (2013.01); *G02F 1/133308* (2013.01); *G02F 1/133603* (2013.01); *G09F 13/00* (2013.01); *G02F 2001/13332* (2013.01); *G02F 2001/133314* (2013.01); *G09F 9/33* (2013.01); *G09F 9/35* (2013.01); *G09F 2013/222* (2013.01)

(58) Field of Classification Search
CPC ......... G02F 1/133608; G02F 1/133308; G02F 1/133603; G02F 2001/13332; G02F 2001/133314; G09F 13/00; G09F 2013/222; G09F 9/33; G09F 9/35
See application file for complete search history.

(56) References Cited

U.S. PATENT DOCUMENTS

2013/0141896 A1 6/2013 Li et al.
2013/0271694 A1 10/2013 Chang et al.

FOREIGN PATENT DOCUMENTS

KR 1020060084871 A 7/2006
KR 100640987 B1 10/2006
KR 1020070112503 A 11/2007

*Primary Examiner* — Tracie Y Green
(74) *Attorney, Agent, or Firm* — Cantor Colburn LLP

(57) ABSTRACT

A display device includes an optical member, a display panel disposed on an upper portion of the optical member, a plurality of light emitting elements disposed on a lower portion of the optical member to provide light to the optical member, a first cover member in which a through-hole is defined, the first cover member accommodating the plurality of light emitting elements, and an optical member supporter inserted into the through-hole to support the optical member. The optical member supporter includes a fixing member of which a portion is inserted into the through-hole and a support member including n coupling blocks (where n is a natural number equal to or greater than 2) which are sequentially coupled in one direction, the support member being coupled to the fixing member to support the optical member.

18 Claims, 9 Drawing Sheets

DISPLAY DEVICE HAVING AN OPTICAL MEMBER SUPPORTER TO PREVENT THE OPTICAL MEMBER FROM BEING DEFLECTED

This application claims priority to Korean Patent Application No. 10-2015-0154071, filed on Nov. 3, 2015, and all the benefits accruing therefrom under 35 U.S.C. § 119, the content of which in its entirety is herein incorporated by reference.

BACKGROUND

1. Field

Exemplary embodiments of the invention herein relate to a display device, and more particularly, to a display device including an optical member supporter to prevent an optical member from being deflected.

2. Description of the Related Art

A display panel, which displays an image, may be a non-light emitting type display device such as a liquid crystal display device that may not emit light by itself. In this case, a light emitting unit for providing light to the display panel is provided. The light emitting unit generally includes a plurality of light emitting elements for emitting light. The light emitting elements may include a light emitting diode ("LED"), for example. The LED has a power consumption less than that of a cold cathode fluorescent lamp, and has excellent color reproducibility.

The light emitting unit is classified into an edge type and a direct type according to a position of the plurality of light emitting elements. The light emitting elements provided to the direct type light emitting unit are disposed below the display panel.

The non-light emitting type display device includes optical members to enhance optical characteristics of light provided from the light emitting unit. The optical members are disposed below the display panel. Here, the non-light emitting type display device includes a plurality of optical member supporters to support the optical members.

SUMMARY

Exemplary embodiments of the invention provide a display device including an optical member supporter to prevent an optical member from being deflected.

An exemplary embodiment of the invention provides a display device including an optical member, a display panel disposed on an upper portion of the optical member, a plurality of light emitting elements disposed on a lower portion of the optical member to provide light to the optical member, a first cover member in which a through-hole is defined, the first cover member accommodating the light emitting elements, and an optical member supporter inserted into the through-hole to support the optical member. The optical member supporter includes a fixing member of which a portion is inserted into the through-hole, and a support member including n coupling blocks (where n is a natural number equal to or greater than 2) that are sequentially coupled in one direction, the support member being coupled to the fixing member to support the optical member.

In an exemplary embodiment, the fixing member may include a plate part disposed on an upper portion of the first cover member to cover the through-hole, a hook part extending from one end of the plate part, the hook part being inserted into the through-hole, and a fixing block part extending from the other end of the plate part in the one direction, the fixing block part being coupled to a first coupling block of the n coupling blocks.

In an exemplary embodiment, the fixing block part may include a fixing body extending from the plate part and a fixing protrusion extending from the fixing body in the one direction and coupled to the first coupling block of the n coupling blocks.

In an exemplary embodiment, each of the n coupling blocks may include a coupling body in which a predetermined coupling groove is defined and which includes a coupling protrusion extending from the coupling body in the one direction, and the coupling protrusion of an i-1-th coupling block (where i is a natural number that is greater than 1 and equal to or less than n) of the n coupling blocks is inserted into the predetermined coupling groove of an i-th coupling block.

In an exemplary embodiment, n-1 coupling blocks of the n coupling blocks may have the same shape as each other, a remaining one of the n coupling blocks may have a shape different from that of each of the n-1 coupling blocks, and the coupling protrusion of the remaining one coupling block may support the optical member.

In an exemplary embodiment, each of the n-1 coupling blocks may have a length that is different from that of the remaining one coupling block in the one direction.

In an exemplary embodiment, the n coupling blocks may have the same shape as each other.

In an exemplary embodiment, a fixing groove into which a portion of the first coupling block of the n coupling blocks is inserted may be defined in the fixing block part.

In an exemplary embodiment, each of the first to a n-1-th coupling blocks of the n coupling blocks may include a coupling body having a predetermined coupling groove and a coupling protrusion extending from the coupling body, the coupling protrusion of the i-th coupling block (where i is a natural number that is greater than 1 and equal to or less than n) of the first to the n-1-th coupling blocks may be inserted into the predetermined coupling groove of the i-1-th coupling block, the coupling protrusion of the first coupling block may be inserted into the fixing groove of the fixing block part, and an n-th coupling block of the n coupling blocks may be coupled to the n-1 -th coupling block.

In an exemplary embodiment, the first to the n-1-th coupling blocks may have the same shape as each other, and the n-th coupling block may have a shape different from that of each of the first to the n-1-th coupling blocks.

In an exemplary embodiment, each of the first to the n-1-th coupling blocks may have a length that is different from that of the n-th coupling block in the one direction.

In an exemplary embodiment, each of the n coupling blocks may include a coupling body in which a predetermined coupling groove is defined and which includes a coupling protrusion extending from the coupling body in the one direction, n-1 coupling blocks of the n coupling blocks may have the same shape as each other, and the remaining one coupling block of the n coupling blocks may have a shape different from that of each of the n-1 coupling blocks, and the remaining one coupling block may be coupled to the fixing member.

In an exemplary embodiment, the coupling body of each of the n-1 coupling blocks may include a first surface exposed from the coupling protrusion, a second surface in which a predetermined coupling groove is defined, and a side surface connecting the first surface to the second surface, and the coupling body of the remaining one coupling block may include a third surface exposed from the coupling protrusion and a fourth surface having an area that is different from that of the third surface and in which the predetermined coupling groove is defined.

In an exemplary embodiment, the first surface and the second surface may have the same area as each other, and the third surface may have an area that is equal to that of each of the first surface and the second surface and less than that of the fourth surface.

In an exemplary embodiment, the first cover member may include a bottom part and sidewalls extending from the bottom part in the one direction. A groove part overlapping the through-hole may be defined in the bottom part.

In an exemplary embodiment, the fixing member may include a plate part disposed on an upper portion of the first cover member to cover the through-hole, a hook part extending from one end of the plate part, the hook part being inserted into the through-hole, and a fixing block part extending from the other end of the plate part in the one direction, the fixing block part being coupled to the first coupling block of the n coupling blocks. The plate part may be disposed in the groove part of the first cover member.

In an exemplary embodiment, the optical member supporter may be provided in plurality.

In an exemplary embodiment, the display device may further include a second cover member disposed above the display panel to cover an edge portion of at least the display panel.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Since the invention may have diverse modified embodiments, preferred embodiments are illustrated in the drawings and are described in the detailed description of the invention.

However, this does not limit the invention within specific embodiments and it should be understood that the invention covers all the modifications, equivalents, and replacements within the idea and technical scope of the invention.

Like reference numerals refer to like elements throughout. In the accompanying drawings, the dimensions of layers and regions are exaggerated for clarity of illustration. It will be understood that although the terms of first and second are used herein to describe various elements, these elements should not be limited by these terms. The terms are only used to distinguish one component from other components. For example, a first element referred to as a first element in one embodiment can be referred to as a second element in another exemplary embodiment. The terms of a singular form may include plural forms unless referred to the contrary.

The meaning of "include," "comprise," "including," or "comprising," specifies features, integers, steps, operations, elements, components or combinations thereof listed in the specification but does not exclude other features, integers, steps, operations, elements, components or combinations thereof.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Figure 1:
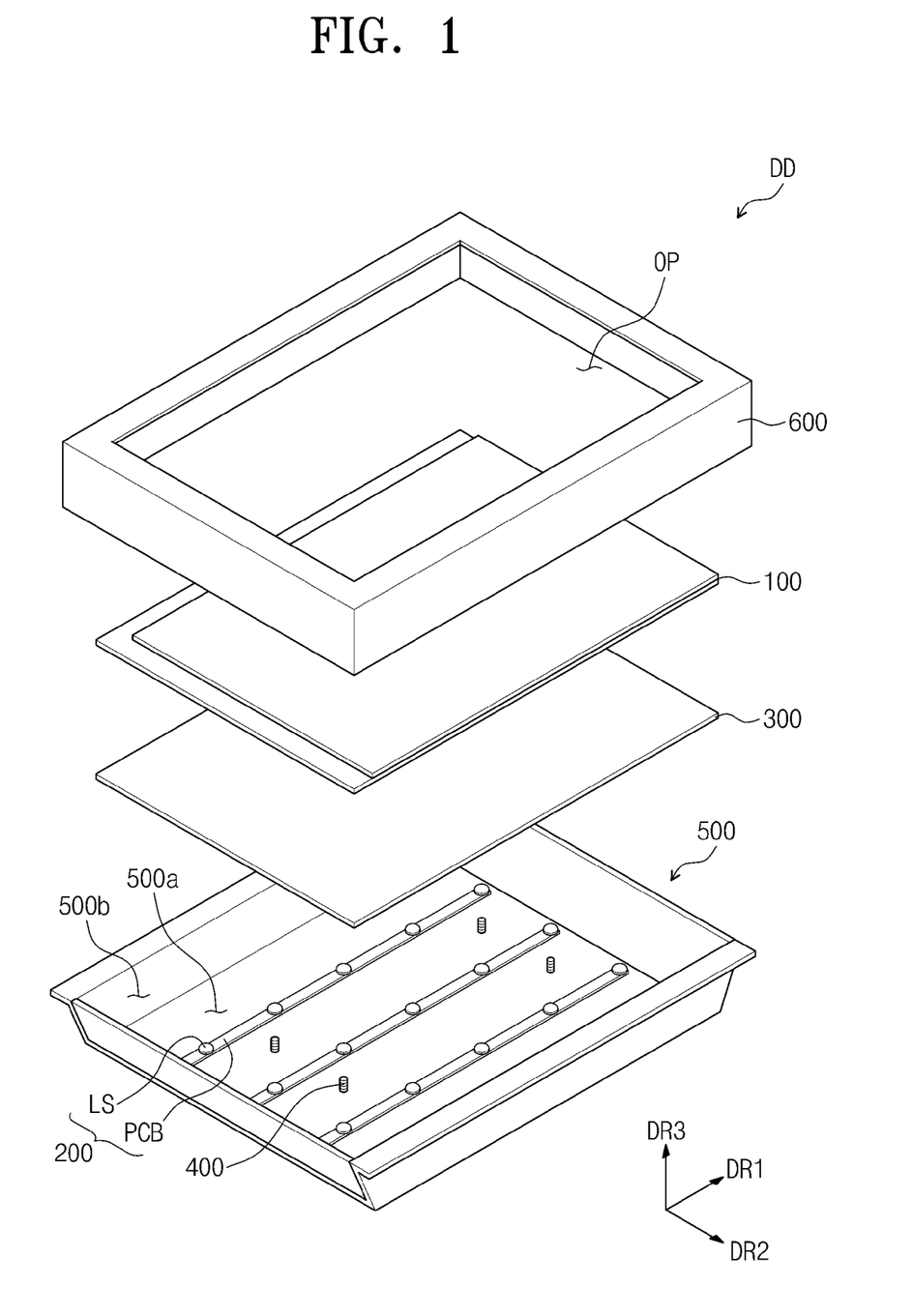
FIG. 1 is a perspective view of an exemplary embodiment of a display device according to the invention.
Figure 2:
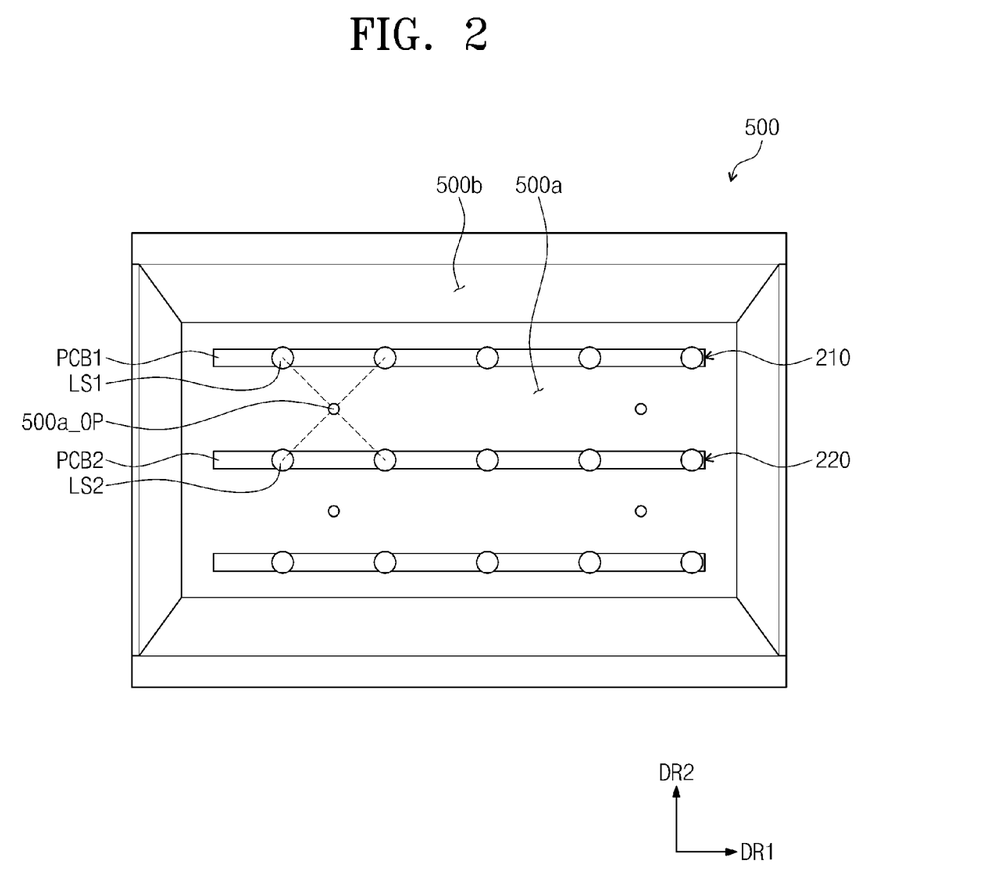
FIG. 2 is a partial plan view of the display device in FIG. 1.
Figure 3:
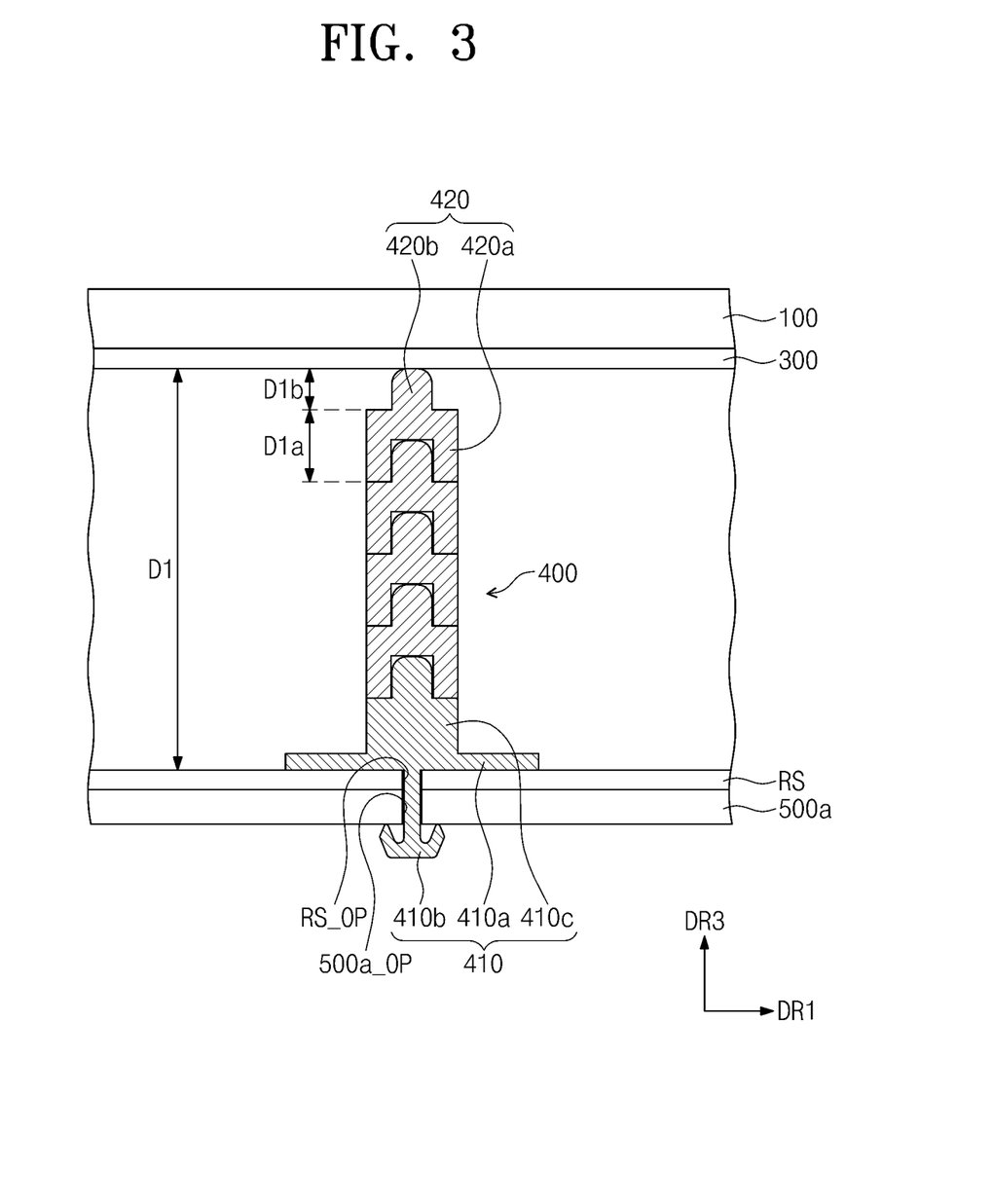
FIG. 3 is a partial cross-sectional view of an exemplary embodiment of the display device including a front view of an optical member supporter in FIG. 1 according to the invention.
Figure 4A:
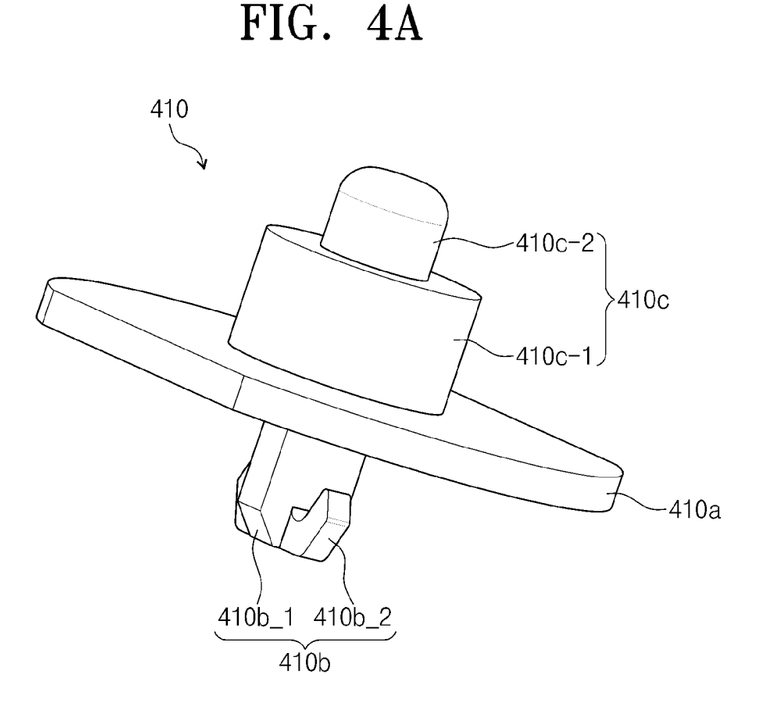
FIG. 4A is a perspective view of a fixing block in FIG. 3.
Figure 4B:
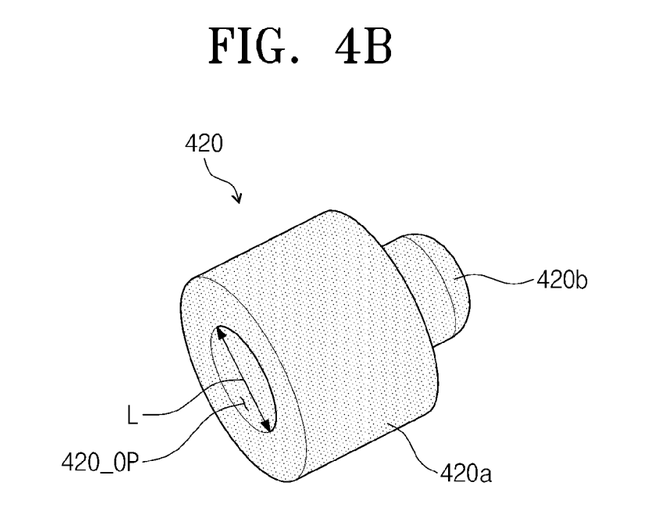
FIG. 4B is a perspective view of a coupling block in FIG. 3.

FIG. 1 is a perspective view of a display device according to an exemplary embodiment of the invention. FIG. 2 is a partial plan view of the display device in FIG. 1. FIG. 3 is a partial cross-sectional view of the display device including an optical member supporter in FIG. 1 according to an exemplary embodiment of the invention. FIG. 4A is a perspective view of a fixing block in FIG. 3. FIG. 4B is a perspective view of a coupling block in FIG. 3.

According to an exemplary embodiment of the invention, a display apparatus DD may be used in large-sized electronic devices such as a television or an outdoor advertising board, and small and medium sized electronic devices such as a personal computer, a notebook computer, a navigation unit for vehicle, and a camera. Also, according to an exemplary embodiment of the invention, the display device DD may include various types of electronic devices such as a tablet personal computer ("PC"), a smartphone, a personal digital assistant ("PDA"), a portable multimedia player ("PMP"), a game console, a wrist watch type electronic devices, and the like. However, theses are only exemplary embodiments and the invention is not limited thereto. That is, the display device DD may be adaptable to various other types of electronic devices. Although not shown, the display device DD may include a flexible shape, for example.

Referring to FIG. 1, the display device DD may include a display panel 100, a light emitting unit 200, an optical member 300, an optical member supporter 400, a first cover member 500, and a second cover member 600. The display panel 100, the light emitting unit 200, the optical member 300, and the optical member supporter 400 are protected by the first cover member 500 and the second cover member 600.

Also, the display panel 100 for displaying an image may be parallel to a surface defined by a first direction DR1 and a second direction DR2. A third direction DR3 indicates a direction normal to the display panel 100. The third direction DR3 indicates a thickness direction of the display device DD. Each of the members has front and rear surfaces that are distinguished by the third direction DR3. However, the directions indicated by the first to third directions DR1 to DR3 may be a relative concept and change with respect to each other.

The display panel 100 may be disposed between the second cover member 600 and the optical member 300. Although the display panel 100 may not generate light itself and thus receive light from the light emitting unit 200 to display an image, an exemplary embodiment of the invention is not limited thereto. In an exemplary embodiment, the display panel 100 may include various display panels such as a liquid crystal display panel, an electrophoretic display panel, and an electrowetting display panel, for example.

According to an exemplary embodiment, the display panel 100 according to an exemplary embodiment of the invention will be described as the liquid crystal display panel, for example. The display panel 100 may include a first substrate, a second substrate facing the first substrate, and a liquid crystal layer disposed therebetween. The display panel 100 may be divided into a display area and a non-display area surrounding the display area. The display area is an area for displaying an image on a plane, and the non-display area is an area that is adjacent to the display area on the plane and on which an image is not displayed.

The light emitting unit 200 may be disposed between the optical member 300 and the first cover member 500, and substantially disposed (e.g., mounted) on the first cover member 500. Each of the light emitting units 200 may include a plurality of light emitting elements LS constituting a point light source and a printed circuit board PCB on which the light emitting elements LS may be disposed. In an exemplary embodiment, each of the light emitting elements LS may be provided with a light emitting diode ("LED"), for example. The light emitting unit 200 may be provided in plurality.

Also, according to an exemplary embodiment, the light emitting unit 200 may be disposed below the display panel 100 to provide light to the display panel 100. That is, in an exemplary embodiment, the light emitting unit 200 may be provided in a direct-type method, for example, in which the light emitting elements LS may be disposed below the display panel 100 to provide light in a third direction DR3.

The optical member 300 may be disposed between the display panel 100 and the light emitting unit 200, and receives light emitted from the light emitting elements LS. The optical member 300 may enhance optical characteristics of the received light to provide the light to the display panel 100. In an exemplary embodiment, the optical member 300 may include a diffusion sheet, a prism sheet, and a protection sheet, or further include other kinds of sheets, for example.

The optical member supporter 400 may be disposed below the optical member 300 and coupled to the first cover member 500. The optical member supporter 400 may be provided in plurality and coupled to the first cover member 500 to support the optical member 300.

The optical member supporter 400 may include a transparent material through which light spread in a radial form from the light emitting elements LS passes. In an exemplary embodiment, the optical member supporter 400 may include transparent plastic such as polycarbonate. Here, the term "transparent" may denote a transmittance equal to or greater than about 85 percent (%), for example.

In an exemplary embodiment, the first cover member 500 and the second cover member 600 may be coupled to each other and include metal or plastic, for example.

The first cover member 500 may be disposed below the display panel 100 to accommodate the light emitting unit 200. The first cover member 500 may include a bottom part 500a and a plurality of sidewalls 500b bent from edges of the bottom part 500a to extend in the third direction DR3.

The light emitting unit 200 may be disposed (e.g., mounted) on the bottom part 500a of the first cover member 500. Also, a reflective sheet RS (refer to FIG. 3) may be disposed on the bottom part 500a of the first cover member 500, or a reflective material may be applied on the bottom part 500a of the first cover member 500. In this case, the light emitting unit 200 may be disposed on an upper portion of the reflective sheet RS.

The second cover member 600 may be disposed on an upper portion of the display panel 100 to cover the non-display area of the display panel 100. An opening OP through which an image passes may be defined in the second cover member 600. The opening OP may correspond to the display area of the display panel 100.

The light emitting unit 200 will be described in more detail with reference to FIG. 2. As described above, the light emitting unit 200 may be provided in plurality. In an exemplary embodiment, in FIG. 2, the light emitting unit 200 is divided into a first light emitting unit 210 and a second light emitting unit 220, for example. According to an exemplary embodiment of the invention, the first light emitting unit 210 and the second light emitting unit 220 are alternately arranged on the first cover member 500 in the second direction DR2.

Each of the first light emitting unit 210 and the second light emitting unit 220 may include a plurality of light emitting elements. Here, the light emitting elements provided to the first light emitting unit 210 are defined as first group light emitting elements LS1, and the light emitting elements provided to the second light emitting unit 220 are defined as second group light emitting elements LS2.

The first group light emitting elements LS1 are disposed (e.g., mounted) on a first printed circuit board PCB1, and the second group light emitting elements LS2 are disposed (e.g., mounted) on a second printed circuit board PCB2. Each of the first printed circuit board PCB1 and the second printed circuit board PCB2 may include wirings transmitting an electric signal.

The first group light emitting elements LS1 are arranged in a row on in the first direction DR1 the first printed circuit board PCB1. The first group light emitting elements LS1 may be spaced apart from each other by a predetermined distance on the first printed circuit board PCB1 and serially connected to each other. As a result, the first group light emitting elements LS1 may be turned-on or turned-off at the same time.

The second group light emitting elements LS2 are arranged in a row in the first direction DR1 on the second printed circuit board PCB2. Here, when the second printed circuit board PCB2 is compared with the first printed circuit board PCB1, the second printed circuit board PCB2 may be spaced a predetermined distance from the first printed circuit board PCB1 in the second direction DR2 and disposed on the bottom part 500a of the first cover member 500. Likewise, the second group light emitting elements LS2 may be spaced apart from each other by a predetermined distance on the second printed circuit board PCB2 and serially connected to each other. As a result, the second group light emitting elements LS2 may be turned-on or turned-off at the same time.

The first group light emitting elements LS1 and the second group light emitting elements LS2 may be spaced apart from each other by a predetermined distance and face each other in the second direction DR2. That is, the first group light emitting elements LS1 and the second group light emitting elements LS2 may have a checkered shape on the bottom part 500a. However, the technical idea of an exemplary embodiment of the invention is not limited thereto. In an exemplary embodiment, the first group light emitting elements LS1 and the second group light emitting elements LS2 may be arranged alternately to each other, for example.

According to an exemplary embodiment, a through-hole 500a OP may be defined in the bottom part 500a of the first cover member 500. A plurality of through-holes 500a_OP may be defined in the bottom part 500a to correspond to the number of the optical member supporter 400. According to an exemplary embodiment, the first group light emitting elements LS1 and the second group light emitting elements LS2 may be arranged to have a rectangular shape, and the through-hole 500a_OP may be defined in a center portion of the rectangle.

As illustrated in FIG. 3, a reflective sheet RS may be disposed on the bottom part 500a of the first cover member 500. A portion of the optical member supporter 400 may be inserted into the through-hole defined in each of the reflective sheet RS and the first cover member 500, and a remaining portion of the optical member supporter 400 may support the optical member 300.

Hereinafter, the above described through-hole defined in the bottom part 500a of the first cover member 500 is defined as a first through-hole 500a_OP, and the through-hole defined in the reflective sheet RS is defined as a second through-hole RS_OP. The first through-hole 500a OP and the second through-hole RS_OP may overlap each other.

In detail, the optical member supporter 400 may include a fixing member 410 and a support member 420.

First, referring to FIGS. 3 and 4A, the fixing member 410 may include a plate part 410a, a hook part 410b, and a fixing block part 410c. The plate part 410a may be disposed on the reflective sheet RS to cover the first through-hole 500a_OP and the second through-hole RS_OP. The plate part 410a may be provided with various shapes. The plate part 410a may have a width w1 taken along a plane defined by the first direction DR1 and the second direction DR2 greater than each of widths of the hook part 410b and the fixing block part 410c taken along a plane defined by the first direction DR1 and the second direction DR2.

The hook part 410b may extend from one end of the plate part 410a in the third direction DR3. Here, the hook part 410b may be inserted into the first through-hole 500a_OP and the second through-hole RS_OP.

The hook part 410b may include an insertion shaft 410b-1 disposed in the first through-hole 500a_OP and the second through-hole RS_OP. Also, the hook part 410b may include a latch 410b-2 passing through the first through-hole 500a_OP and the second through-hole RS_OP and disposed outside the bottom part 500a. Here, the latch 410b-2 may have various shapes. In an exemplary embodiment, the latch 410b-2 may have a spherical or polypyramid shape connected to an end of the insertion shaft 410b-1, for example. The latch 410b-2 may pass through the first through-hole 500a_OP and the second through-hole RS_OP in a press-fitting method and disposed outside the bottom part 500a.

The fixing block part 410c may extend from the other end of the plate part 410a in the third direction DR3. In detail, the fixing block part 410c may include a fixing body 410c-1 and a fixing protrusion 410c-2.

The fixing body 410c-1 has one end connected to the other end of the plate part 410a and the other end connected to one end of the fixing protrusion 410c-2. Here, the one end of the fixing body 410c-1 and the other end of the plate part 410a may face each other in the third direction DR3. Also, the one end of the fixing body 410c-1 may partially overlap the other end of the plate part 410a. Although the fixing body 410c-1 has a cylindrical shape in FIG. 4A, the invention is not limited thereto, and the fixing body 410c-1 may have various other shapes.

The fixing protrusion 410c-2 may extend from the fixing body 410c-1 and be coupled to the support member 420. In detail, the one end of the fixing protrusion 410c-2 may be connected to the other end of the fixing body 410c-1 and partially overlap the other end of the fixing body 410c-1.

In the typical case, since the fixing member and the support member of the optical member supporter for supporting the optical member are provided as a single body, the optical member supporter may not change in shape.

According to an exemplary embodiment of the invention, the fixing member 410 and the support member 420 may be coupled to each other and separated from each other. Also, the support member 420 according to an exemplary embodiment of the invention may include a plurality of coupling blocks that are separable from each other. One of the plurality of coupling blocks may be coupled to the fixing member 410.

In detail, referring to FIGS. 3 and 4B, the fixing member 420 may include n coupling blocks that are sequentially coupled in the third direction DR3, where n is a natural number equal to or greater than 2. Each of the n coupling blocks may include a coupling body 420a and a coupling protrusion 420b.

As illustrated in FIG. 4B, a coupling groove 420_OP having a predetermined diameter L through which the coupling protrusion 420b or the fixing protrusion 410c is inserted may be defined in the coupling body 420a. Also, the coupling protrusion 420b may have a shape extending from the coupling body 420a. The coupling protrusion 420b may partially overlap the coupling body 420a.

According to an exemplary embodiment, a coupling protrusion of an i-1-th coupling block of the n coupling blocks may be inserted into a coupling groove of an i-th coupling block, where i is a natural number that is greater than 1 and equal to or less than n.

According to an exemplary embodiment, the coupling body 420a of a first coupling block of the n coupling blocks may be coupled to the fixing protrusion 410c. That is, the fixing protrusion 410c of the fixing member 410 may be inserted into the coupling groove 420_OP defined in the coupling body 420a of the first coupling block. Also, the coupling protrusion 420b of an n-th coupling block of the n coupling blocks may support the optical member 300.

According to an exemplary embodiment, each of the n coupling blocks may have the same shape as each other. Here, in the third direction DR3, the coupling body 420a has a length defined as a second length D1a, and the coupling protrusion 420b has a length defined as a third length D1b. In this case, in the third direction DR3, a total length in which the fixing member 410 and the support member 420 are coupled to each other may be defined as a first length D1 that is a length from the reflective sheet RS to the optical member 300.

Figure 5:
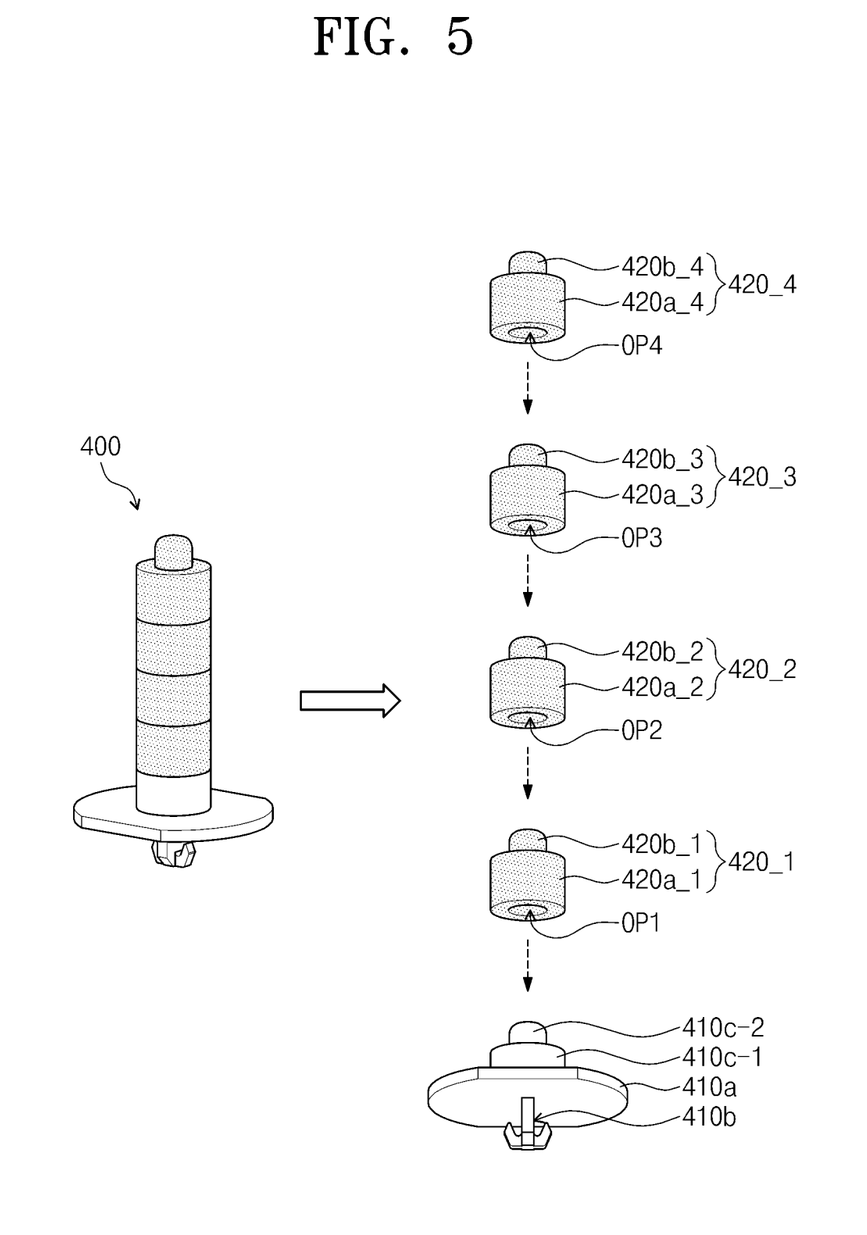
FIG. 5 is an exploded view of an exemplary embodiment of an optical member supporter according to the invention.

FIG. 5 is an exploded view of the optical member supporter according to an exemplary embodiment of the invention.

Referring to FIGS. 3 and 5, for convenience of description, the support member 420 including four coupling blocks that are sequentially coupled to each other will be described. The four coupling blocks may have the same shape as each other and be separated from and coupled to each other.

In detail, a first coupling block 420_1 of the four coupling blocks may include a first coupling body 420a_1 into which the fixing protrusion 410c-2 is inserted and a first coupling protrusion 420b_1 extending from the first coupling body 420a_1. Here, the fixing protrusion 410c-2 provided to the fixing member 410 may be inserted into the first coupling groove OP1 defined in the first coupling body 420a_1. In this case, as the fixing protrusion 410c-2 is inserted into the first coupling groove OP1, the first coupling body 420a_1 and the fixing body 410c-1 may be coupled to each other.

A second coupling block 420_2 of the four coupling blocks may include a second coupling body 420a_2 into which the first coupling protrusion 420b_1 is inserted and a second coupling protrusion 420b_2 extending from the second coupling body 420a_2. Here, the first coupling protrusion 420b_1 may be inserted into a second coupling groove OP2 defined in the second coupling body 420a_2. In this case, as the first fixing protrusion 410b_1 is inserted into the second coupling groove OP2, the second coupling body 420a_2 and the first coupling body 420a_1 may be coupled to each other.

A third coupling block 420_3 of the four coupling blocks may include a third coupling body 420a_3 into which the second coupling protrusion 420b_2 is inserted and a third coupling protrusion 420b_3 extending from the third coupling body 420a_3. Here, the second coupling protrusion 420b_2 may be inserted into a third coupling groove OP3 defined in the third coupling body 420a_3. In this case, as the second coupling protrusion 410b_2 is inserted into the third coupling groove OP3, the third coupling body 420a_3 and the second coupling body 420a_2 may be coupled to each other.

A 4-th coupling block 420_4 of the four coupling blocks may include a fourth coupling body 420a_4 into which the third coupling protrusion 420b_3 is inserted and a fourth coupling protrusion 420b_4 extending from the fourth coupling body 420a_4. Here, the third coupling protrusion 420b_3 may be inserted into a fourth coupling groove OP4 defined in the fourth coupling body 420a_4. In this case, as the third coupling protrusion 420b_3 is inserted into the fourth coupling groove OP4, the fourth coupling body 420a_4 and the third coupling body 420a_3 may be coupled to each other. The fourth coupling protrusion 420b_4 may support the optical member 300.

As described above, the optical member supporter 400 may include the n coupling blocks that are separated from and coupled to each other. That is, as the number of the n coupling blocks provided to the support member 420 is adjustable, a length of the optical member supporter 400 for supporting the optical member 300 may be adjusted.

Figure 6:
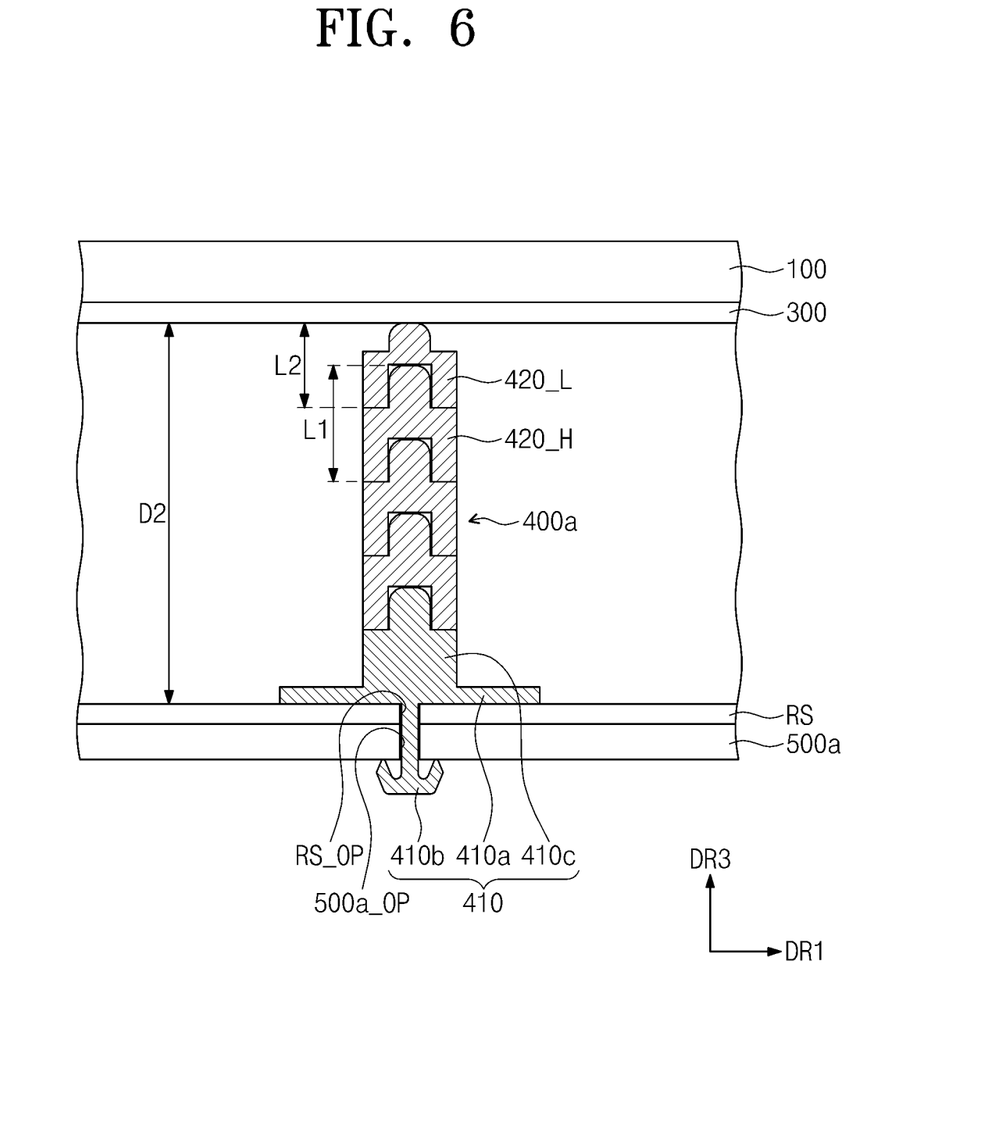
FIG. 6 is a partial cross-sectional view of another exemplary embodiment of a display device including the optical member supporter in FIG. 1 according to the invention.

FIG. 6 is a partial cross-sectional view of a display device including an optical member supporter in FIG. 1 according to another exemplary embodiment of the invention.

Referring to FIG. 6, when an optical member supporter 400a in FIG. 6 is compared with the optical member supporter 400 in FIG. 3, coupling blocks may have shapes different from each other. In detail, although coupling blocks in FIG. 6 and the coupling blocks in FIG. 3 may have the same structure as each other, they have lengths different from each other in the third direction DR3. Also, since a fixing member 410 in FIG. 6 has the same constitution as the fixing member 410 in FIG. 3, a detailed description for this will be omitted.

According to an exemplary embodiment, n-1 coupling blocks of the n coupling blocks that are sequentially coupled to each other may have the same shape as each other, and the remaining one coupling block of the n coupling blocks may have a shape different from that of each of the n-1 coupling blocks. Where, n is a natural number equal to or greater than 2. Here, a coupling protrusion of the remaining one coupling block may support the optical member.

Hereinafter, the n-1 coupling blocks of the n coupling blocks are defined as a first coupling block 420_H, and the remaining one coupling block of the n coupling blocks is defined as a second coupling block 420_L. That is, the support member 420 in FIG. 6 may include the three first coupling blocks 420_H and the one second coupling block 420_L. Here, since a coupling structure between the first coupling block 420_H and the second coupling block 420_L in FIG. 6 is the same as that between the coupling blocks in FIG. 3, a detailed description for this will be omitted.

According to an exemplary embodiment of the invention, the optical member supporter 400a in FIG. 6 may include the first coupling blocks 420_H and the second coupling block 420_L, which have different lengths in the third direction DR3. The first coupling block 420_H has a first body length L1 in the third direction DR3, and the second coupling block 420_L has a second body length L2 in the third direction DR3. In this case, in the third direction DR3, a total length in which the fixing member 410 and the support member 420 are coupled to each other may be defined as a second length D2 that is a length from the reflective sheet RS to the optical member 300.

As described above, the optical member supporter 400a in FIG. 6 may include the coupling blocks that have different lengths from each other. As a result, according to a distance between the optical member 300 and the reflective sheet RS, the length of the optical member supporter 400a may be more easily adjusted.

Figure 7:
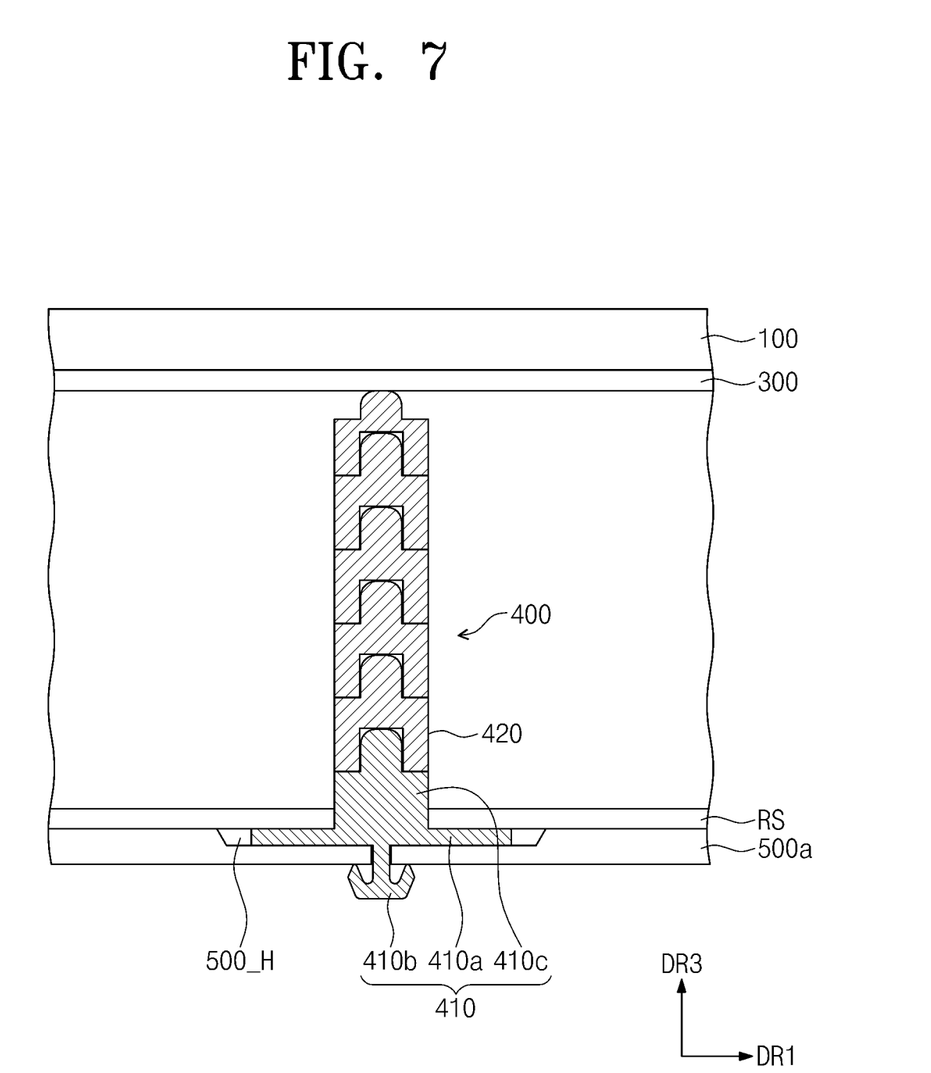
FIG. 7 is a partial cross-sectional view of another exemplary embodiment of a display device including the optical member supporter in FIG. 1 according to the invention.

FIG. 7 is a partial cross-sectional view of a display device including the optical member supporter in FIG. 1 according to another exemplary embodiment of the invention.

Referring to FIGS. 1 and 7, a groove part 500_H (not shown in FIG. 1) overlapping the through-hole 500a_OP (refer to FIGS. 2 and 3) may be defined in the bottom part 500a of the first cover member 500. The groove part 500_H may be provided in plurality on the basis of the number of the through-hole 500a_OP (refer to FIGS. 2 and 3). The optical member supporter 400, the reflective sheet RS, the display panel 100, and the optical member 300 in FIG. 7 may have the same constitution as the optical member supporter 400, the reflective sheet RS, the display panel 100, and the optical member 300 in FIG. 1. Thus, a detailed description for the above-described elements will not be provided.

According to an exemplary embodiment, the plate part 410a may be disposed in a groove part 500_H defined in the bottom part 500a. That is, the plate part 410a may be disposed between the reflective sheet RS and the bottom part 500a.

Likewise, when the plate part 410a may be disposed in the groove part 500_H, the optical member supporter 400 may not be disposed between the reflective sheet RS and the optical member 300 in the third direction DR3. That is, when the optical member supporter 400 has a predetermined length that is greater than a distance between the reflective sheet RS and the optical member 300 in the third direction DR3, the shape of the groove part may be provided in the bottom part 500a of the first cover member 500. As a result, the plate part 410a may be disposed in the groove part 500_H of the bottom part 500a instead of an upper portion of the reflective sheet RS.

Figure 8:
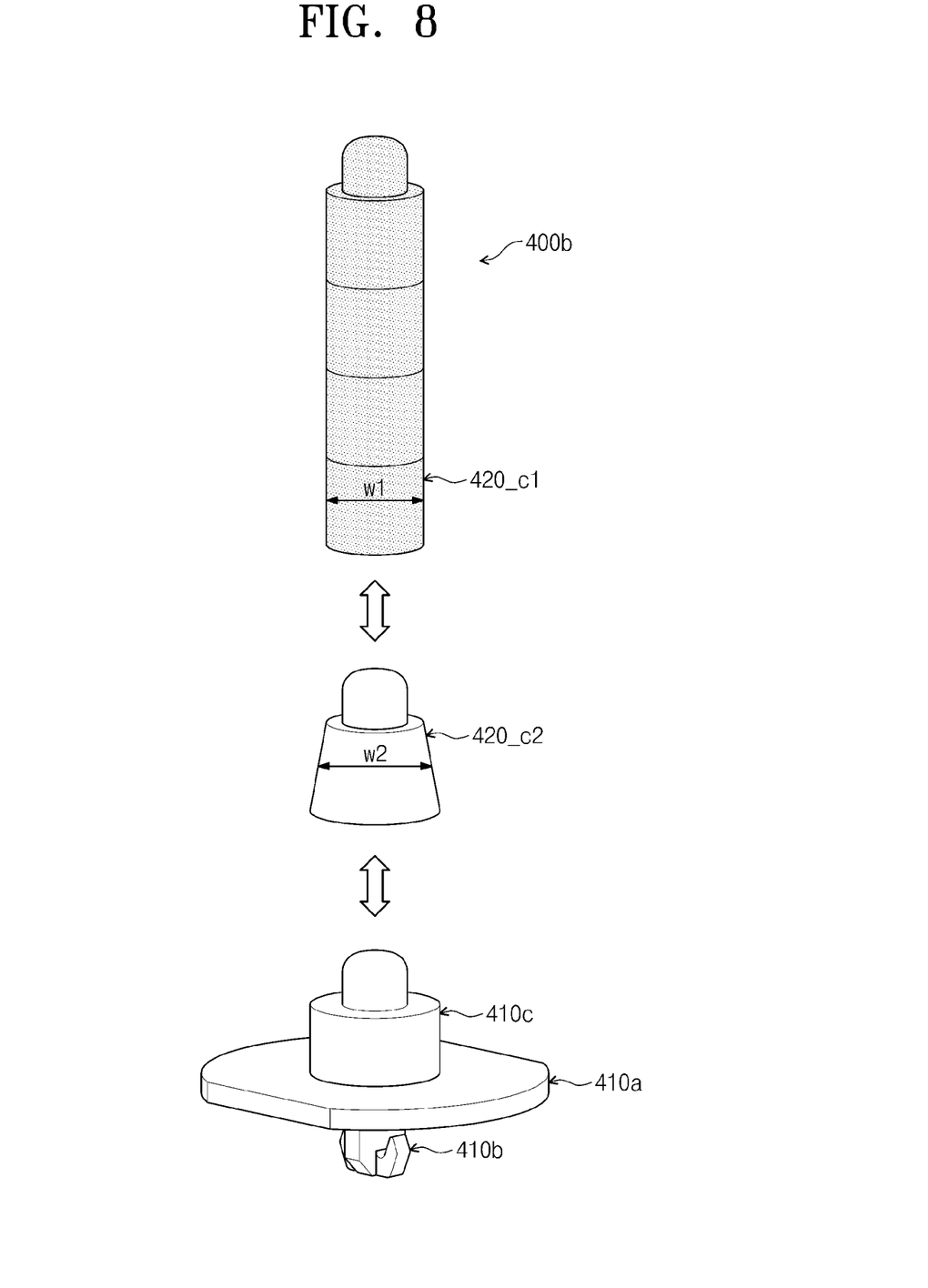
FIG. 8 is an exploded view of another exemplary embodiment of an optical member supporter according to the invention.

FIG. 8 is an exploded view of an optical member supporter according to another exemplary embodiment of the invention.

Referring to FIG. 8, when an optical member supporter 400b is compared with the optical member supporter 400 in FIG. 3, coupling blocks may have shapes different from each other.

According to an exemplary embodiment, each of the n coupling blocks may include a coupling body in which a predetermined coupling groove is defined and which includes a coupling protrusion extending from the coupling body in the third direction DR3. Where, n is a natural number equal to or greater than 2. Here, n-1 coupling blocks of the n coupling blocks may have the same shape as each other, and the remaining one coupling block of the n coupling blocks may have a shape different from that of each of the n-1 coupling blocks.

Hereinafter, the n-1 coupling blocks of the n coupling blocks are defined as a first coupling block 420_c1, and the remaining one coupling block of the n coupling blocks is defined as a second coupling block 420_c2. That is, the support member 420 in FIG. 8 may include four first coupling blocks 420_c1 and one second coupling block 420_c2. Here, since a coupling structure between the first coupling block 420_c1 and the second coupling block 420_c2 in FIG. 8 is the same as that between the coupling blocks in FIG. 3, a detailed description for this will be omitted.

According to an exemplary embodiment of the invention, the second coupling block 420_c2 may have a shape different from that of each of the first coupling blocks 420_c1. Also, the second coupling block 420_c2 may be coupled to the fixing block part 410c of the fixing member 410 through a coupling groove defined in a fourth surface.

In detail, the coupling body of each of the first coupling blocks 420_c1 may include a first surface exposed from the coupling protrusion, a second surface in which a predetermined coupling groove is defined, and a side surface connecting the first surface to the second surface. The coupling body of the second coupling block 420_c2 may include a third surface exposed from the coupling protrusion and a fourth surface that has an area different from that of the third surface and in which a predetermined coupling groove is defined.

According to an exemplary embodiment, as the first coupling blocks 420_c1 have the same shape as each other, the first surface and the second surface may have the same area as each other. On the contrary to this, in the coupling body of the second coupling block 420_c2, the third surface may have an area that is the same as that of each of the first and second surfaces and less than that of the fourth surface.

That is, according to the support member 420 in FIG. 8, the first coupling block 420_c1 may have a width w1 along a plane defined by the first direction DR1 and the second direction DR2 that is less than a width w2 of the second coupling block 420_c2 along a plane defined by the first direction DR1 and the second direction DR2. Especially, the width w2 of the second coupling block 420_c2 may gradually decrease from one surface in which the coupling groove is defined to the other surface from which the coupling protrusion is exposed.

Figure 9:
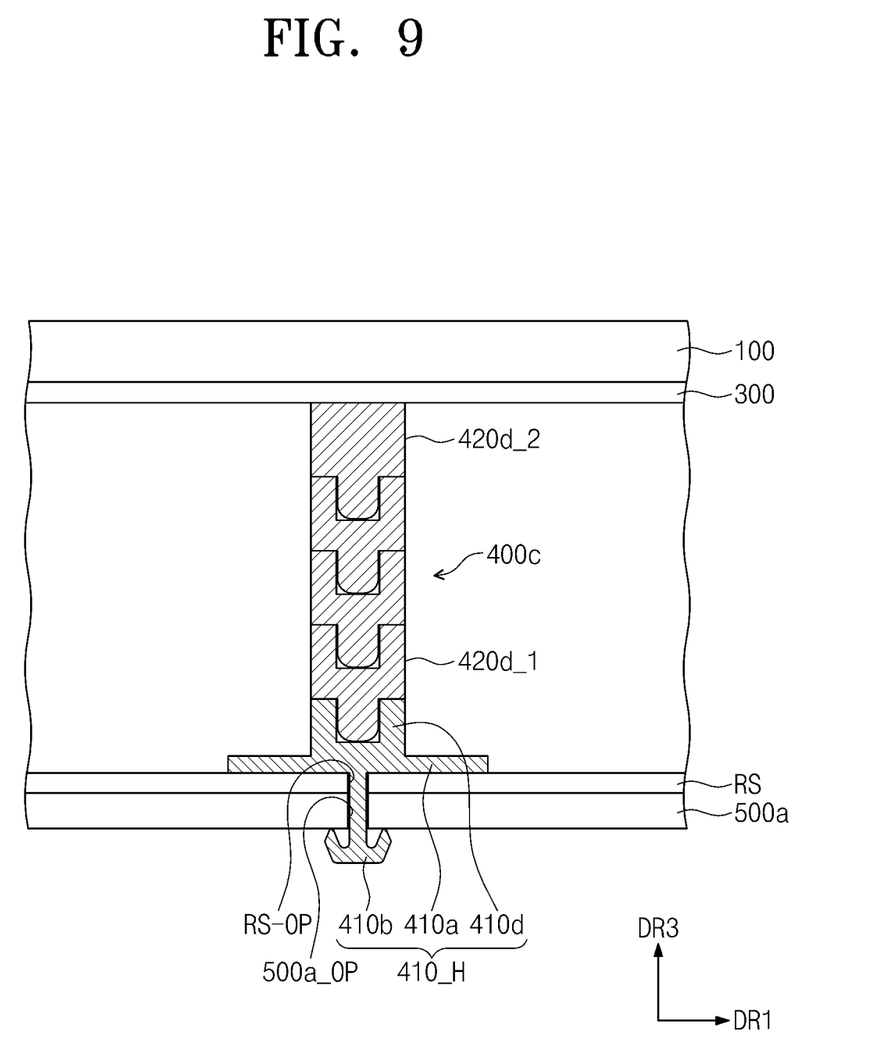
FIG. 9 is a partial cross-sectional view of another exemplary embodiment of a display device including a front view of the optical member supporter in FIG. 1 according to the invention.

FIG. 9 is a partial cross-sectional view of a display device including a front view of the optical member supporter in FIG. 1 according to another exemplary embodiment of the invention.

When the display device in FIG. 9 is compared with that in FIG. 3, constitutions of the fixing protrusion 410c of the fixing member and support member 420 change, and the remaining constitutions are the same as those in the display device in FIG. 3. Thus, a detailed description for the above-described elements will not be provided.

Referring to FIG. 9, the optical member supporter 400c may include a plurality of coupling blocks. Hereinafter, the optical member supporter 400c including n coupling blocks will be described. Where, n is a natural number equal to or greater than 2.

In detail, each of first to n-1-th coupling blocks of the n coupling blocks may include a coupling body in which a predetermined coupling groove is defined and which includes a coupling protrusion extending from the coupling body. Also, an n-th coupling block of the n coupling blocks may be coupled to the n-1-th coupling block.

According to an exemplary embodiment, a coupling protrusion of an i-th coupling block of the first to n-1-th coupling blocks may be inserted into the coupling groove of an i-1-th coupling block. Where, i is a natural number that is greater than 1 and equal to or less than n.

Hereinafter, the first to n-1-th coupling blocks of the n coupling blocks are defined as a first coupling blocks 420d_1, and the n-th coupling block is defined as a second coupling block 420d_2.

According to an exemplary embodiment, the first coupling blocks 420d_1 have the same shape as each other, and the second coupling block 420d_2 has a shape different from that of each of the first coupling blocks 420d_1. In an exemplary embodiment, the coupling groove is not defined in the second coupling block 420d_2 in comparison with the first coupling blocks 420d_1, for example.

In this case, the second coupling block 420d_2 has one surface from which the coupling protrusion is exposed to be coupled to one of the first coupling blocks 420d_1 and the other surface supporting the optical member 300. In this case, the coupling groove may not be defined in the other surface of the second coupling block 420d_2 which supports the optical member 300.

However, the technical idea of an exemplary embodiment of the invention is not limited to the shape of the second coupling block 420d_2. In an exemplary embodiment, the second coupling block 420d_2 may have various shapes, for example.

A fixing member 410_H in FIG. 9 may not include the shape of the fixing protrusion in comparison with the fixing member 410 in FIG. 3. That is, a fixing groove instead of a fixing protrusion may be defined in a fixing block part 410d provided to the fixing member 410_H. In this case, the coupling protrusion of the above described first coupling block may be inserted into the fixing groove defined in the fixing block part 410d.

According to the exemplary embodiment of the invention, the manufacturing costs of the display panel may decrease.

The invention has been particularly shown and described with reference to exemplary embodiments thereof. While specific terms were used, they were not used to limit the meaning or the scope of the invention described in Claims, but merely used to explain the invention. Accordingly, a person having ordinary skill in the art will understand from the above that various modifications and other equivalent embodiments are also possible. Hence, the real protective scope of the invention shall be determined by the technical scope of the accompanying Claims.

What is claimed is:

1. A display device comprising:
   an optical member;
   a display panel disposed on an upper portion of the optical member;
   a plurality of light emitting elements which is disposed on a lower portion of the optical member and provides light to the optical member;
   a first cover member in which a through-hole is defined, the first cover member accommodating the plurality of light emitting elements; and
   an optical member supporter which is inserted into the through-hole and supports the optical member,
   wherein the optical member supporter comprises:
   a fixing member of which a portion is inserted into the through-hole; and
   a support member comprising n coupling blocks (where n is a natural number equal to or greater than 2) which are sequentially coupled in one direction, the support member coupled to the fixing member and supporting the optical member.

2. The display device of claim 1, wherein the fixing member comprises:
   a plate part disposed on an upper portion of the first cover member to cover the through-hole;
   a hook part extending from one end of the plate part, the hook part inserted into the through-hole; and
   a fixing block part extending from the other end of the plate part in the one direction, the fixing block part being coupled to a first coupling block of the n coupling blocks.

3. The display device of claim 2, wherein the fixing block part comprises a fixing body extending from the plate part and a fixing protrusion extending from the fixing body in the one direction and coupled to the first coupling block of the n coupling blocks.

4. The display device of claim 3, wherein each of the n coupling blocks comprises a coupling body in which a predetermined coupling groove is defined and which includes a coupling protrusion extending from the coupling body in the one direction, and
   the coupling protrusion of an i-1-th coupling block (where i is a natural number which is greater than 1 and equal to or less than n) of the n coupling blocks is inserted into the predetermined coupling groove of an i-th coupling block.

5. The display device of claim 4, wherein n-1 coupling blocks of the n coupling blocks have the same shape as each other, a remaining one of the n coupling blocks has a shape different from that of each of the n-1 coupling blocks, and
   the coupling protrusion of the remaining one coupling block supports the optical member.

6. The display device of claim 5, wherein each of the n-1 coupling blocks has a length which is different from that of the remaining one coupling block in the one direction.

7. The display device of claim 4, wherein the n coupling blocks have the same shape as each other.

8. The display device of claim 2, wherein a fixing groove into which a portion of the first coupling block of the n coupling blocks is inserted is defined in the fixing block part.

9. The display device of claim 8, wherein each of the first to a n-1-th coupling blocks of the n coupling blocks comprises a coupling body in which a predetermined coupling groove is defined and which includes a coupling protrusion extending from the coupling body, the coupling protrusion of the i-th coupling block (where i is a natural number which is greater than 1 and equal to or less than n) of the first to the n-1-th coupling blocks is inserted into the predetermined coupling groove of the i-1-th coupling block, the coupling protrusion of the first coupling block is inserted into the fixing groove of the fixing block part, and a n-th coupling block of the n coupling blocks is coupled to the n-1-th coupling block.

10. The display device of claim 9, wherein the first to the n-1-th coupling blocks have the same shape as each other, and the n-th coupling block has a shape different from that of each of the first to the n-1-th coupling blocks.

11. The display device of claim 10, wherein each of the first to the n-1-th coupling blocks has a length which is different from that of the n-th coupling block in the one direction.

12. The display device of claim 1, wherein each of the n coupling blocks comprises a coupling body in which a predetermined coupling groove is defined and which includes a coupling protrusion extending from the coupling body in the one direction, n-1 coupling blocks of the n coupling blocks have the same shape as each other, and a remaining one coupling block of the n coupling blocks has a shape different from that of each of the n-1 coupling blocks, and the remaining one coupling block is coupled to the fixing member.

13. The display device of claim 12, wherein the coupling body of each of the n-1 coupling blocks comprises a first surface exposed from the coupling protrusion, a second surface in which a predetermined coupling groove is defined, and a side surface connecting the first surface to the second surface, and the coupling body of the remaining one coupling block comprises a third surface exposed from the coupling protrusion and a fourth surface having an area that is different from that of the third surface and in which the predetermined coupling groove is defined.

14. The display device of claim 13, wherein the first surface and the second surface have the same area as each other, and the third surface has an area which is equal to that of each of the first surface and the second surface and less than that of the fourth surface.

15. The display device of claim 1, wherein the first cover member comprises a bottom part and sidewalls extending from the bottom part in the one direction, wherein a groove part overlapping the through-hole is defined in the bottom part.

16. The display device of claim 15, wherein the fixing member comprises:

a plate part disposed on an upper portion of the first cover member and covering the through-hole;

a hook part extending from one end of the plate part, the hook part being inserted into the through-hole; and a fixing block part extending from the other end of the plate part in the one direction, the fixing block part coupled to a first coupling block of the n coupling blocks, wherein the plate part is disposed in the groove part of the first cover member.

17. The display device of claim 1, wherein the optical member supporter is provided in plurality.

18. The display device of claim 1, further comprising a second cover member disposed above the display panel and covering an edge portion of at least the display panel.

\* \* \* \* \*